(12) United States Patent
Hirade et al.

(10) Patent No.: US 9,701,852 B2
(45) Date of Patent: Jul. 11, 2017

(54) ACTIVE ENERGY RAY CURABLE COMPOSITION, INK, COMPOSITION STORED CONTAINER, AND TWO-DIMENSIONAL OR THREE-DIMENSIONAL IMAGE FORMING APPARATUS

(71) Applicants: Tomohiro Hirade, Kanagawa (JP); Tomohiro Inoue, Kanagawa (JP)

(72) Inventors: Tomohiro Hirade, Kanagawa (JP); Tomohiro Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 14/867,717

(22) Filed: Sep. 28, 2015

(65) Prior Publication Data

US 2016/0102216 A1 Apr. 14, 2016

(30) Foreign Application Priority Data

Oct. 10, 2014 (JP) ................................. 2014-208563
Jun. 25, 2015 (JP) ................................. 2015-127794

(51) Int. Cl.
| | | |
|---|---|---|
| *C09D 11/101* | (2014.01) | |
| *C09D 11/322* | (2014.01) | |
| *C09D 11/326* | (2014.01) | |

(52) U.S. Cl.
CPC .......... *C09D 11/101* (2013.01); *C09D 11/322* (2013.01); *C09D 11/326* (2013.01)

(58) Field of Classification Search
None
See application file for complete search history.

(56) References Cited

U.S. PATENT DOCUMENTS 7,135,504 B2 * 11/2006 Yamada ............... C09D 11/101
106/31.27

FOREIGN PATENT DOCUMENTS

| JP | 2004-027211 | | 1/2004 |
|---|---|---|---|
| JP | 2005-132874 | | 5/2005 |
| JP | 2008-308692 | | 12/2008 |
| JP | 2009256636 | A * | 11/2009 |
| JP | 2010-095679 | | 4/2010 |
| JP | 2013-112691 | | 6/2013 |

OTHER PUBLICATIONS

Machine translation of JP 2009-256636, Nov. 5, 2009.*

* cited by examiner

*Primary Examiner* — Vickey Nerangis
(74) *Attorney, Agent, or Firm* — Oblon, McClelland, Maier & Neustadt, L.L.P.

(57) ABSTRACT

An active energy ray curable composition includes an inorganic pigment and a polymerizable monomer, wherein the inorganic pigment is carbon black having a ratio of the amount of hydrophilic functional group to the specific surface area in a range of from 7 μmol/m² to 42μmol/m² or a metal oxide having a ratio of the amount of sulfonic acid group to the specific surface area in a range of from 7 μmol/m² to 85 μmol/m², wherein the active energy ray curable composition has a viscosity change rate ($\Delta V$) represented by the following relation 1 from −10 percent by mass to +10 percent by mass:

$$\Delta V(\%) = |V - V_0|/V_0 \times 100 \quad \text{relation 1,}$$

where $V_0$ represents an initial viscosity at 25 degrees C. and V represents a storage viscosity after the active energy ray curable composition is stored still at 70 degrees C. for 14 days.

13 Claims, 2 Drawing Sheets

ACTIVE ENERGY RAY CURABLE COMPOSITION, INK, COMPOSITION STORED CONTAINER, AND TWO-DIMENSIONAL OR THREE-DIMENSIONAL IMAGE FORMING APPARATUS

CROSS-REFERENCE TO RELATED APPLICATIONS

This patent application is based on and claims priority pursuant to 35 U.S.C. §119 to Japanese Patent Application Nos. 2014-208563 and 2015-127794, on Oct. 10, 2014 and Jun. 25, 2015, respectively, in the Japan Patent Office, the entire disclosures of which are hereby incorporated by reference herein.

BACKGROUND

Technical Field

The present invention relates to an active energy ray curing composition, an ink, a container that stores the composition, and a two-dimensional or three-dimensional image forming apparatus.

Background Art

The active energy ray curable composition little produces environmentally harmful substances such as volatile organic compounds (VOC) since the composition normally contains no solvent. In addition, the composition has an appeal since it has advantages such that it quickly dries and can be recorded on a recording medium having non-liquid absorbing property.

Also, for an active energy ray curable composition, a pigment-based ink is preferable to a dye-based ink in most cases since pigments are superior to dyes in terms of various durabilities. However, unlike dyes, pigments are not uniformly dissolved in an ink so that dispersion of pigments in an ink is demanded as uniform as possible.

In fact, no active energy ray curable composition containing a pigment strikes a high level of balance between dispersion stability and discharging property.

SUMMARY

The present invention provides an improved active energy ray curable composition containing an inorganic pigment and a polymerizable monomer, wherein the inorganic pigment is carbon black having a ratio of the amount of hydrophilic functional group to the specific surface area in a range of from 7 $\mu mol/m^2$ to 42 $\mu mol/m^2$ or a metal oxide having a ratio of the amount of sulfonic acid group to the specific surface area in a range of from 7 $\mu mol/m^2$ to 85 $\mu mol/m^2$, wherein the active energy ray curable composition has a viscosity change rate ($\Delta V$) represented by the following relation 1 from −10 percent by mass to +10 percent by mass:

$$\Delta V\ (\%) = |V-V_0|/V_0 \times 100 \qquad \text{relation 1,}$$

where $V_0$ represents an initial viscosity at 25 degrees C. and V represents a storage viscosity after the active energy ray curable composition is stored still at 70 degrees C. for 14 days.

BRIEF DESCRIPTION OF THE SEVERAL VIEWS OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein.

DETAILED DESCRIPTION

Figure 1:
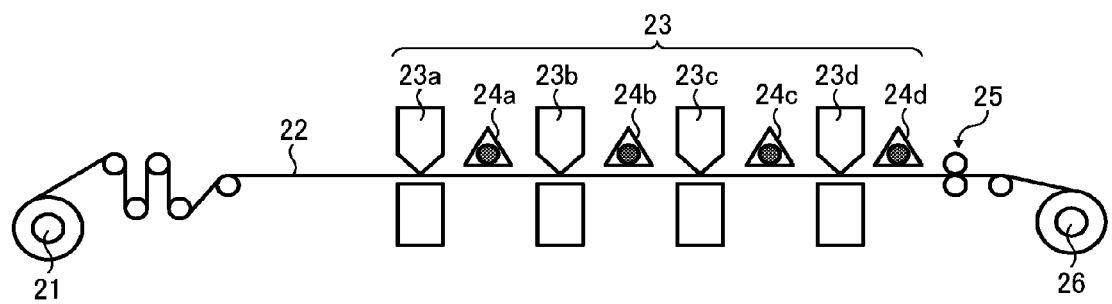
FIG. 1 is a schematic diagram illustrating an example of a two-dimensional image forming apparatus according to an embodiment of the present disclosure.

According to the present invention, provided is an active energy ray curable composition having excellent dispersion stability and discharging property using an inorganic pigment as a colorant simultaneously.

The active energy ray curable composition of the present disclosure is described in detail.

The active energy ray curable composition is occasionally referred to as ink.

The active energy ray curable composition of the present disclosure contains an inorganic pigment and a polymerizable monomer. The inorganic pigment is carbon black having a ratio of the amount of hydrophilic functional group to the specific surface area in a range of from 7 $\mu mol/m^2$ to 42 $\mu mol/m^2$ or a metal oxide having a ratio of the amount of sulfonic acid group to the specific surface area in a range of from 7 $\mu mol/m^2$ to 85 $\mu mol/m^2$, and the viscosity change rate ($\Delta V$) represented by the following relation is from −10 percent by mass to +10 percent by mass:

$$\Delta V\ (\%) = |V-V_0|/V_0 \times 100 \qquad \text{Relation 1}$$

In the Relation 1, $V_0$ represents an initial viscosity at 25 degrees C. and V represents a storage viscosity after the active energy ray curable composition is stored still at 70 degrees C. for 14 days.

The mechanism of the active energy ray curable composition described above having excellent dispersion stability and discharging property simultaneously is not clear but inferred as follows:

In the present disclosure, when the inorganic pigment is carbon black, by dispersing carbon black having a value of the ratio of the amount of hydrophilic functional group to the specific surface area in a range of from 7 $\mu mol/m^2$ to 42 $\mu mol/m^2$ in a polymerizable monomer having a constant polarity, the carbon black having a ratio of the amount of hydrophilic functional group to the specific surface area in a range of from 7 $\mu mol/m^2$ to 42 $\mu mol/m^2$ is partially charge-separated state in the polymerizable monomer. In this state, it is anticipated that the dispersibility of the carbon black is improved by charge repulsion before a dispersant is added. If a dispersant is used for the carbon black receiving this stabilization effect, affinity between the carbon black and the dispersant is enhanced and the adsorption force of the dispersant increases so that the dispersant is not easily detached from the carbon black. This is considered to contribute to enhancement of dispersion stability of the carbon black. In addition, since the dispersion stability is excellent, the viscosity of the active energy ray curable composition does not change so much even if it is stored for a long period of time. As a consequence, discharging property is excellent.

In the present disclosure, when the inorganic pigment is titanium oxide, by dispersing titanium oxide having a ratio of the amount of sulfonic acid group to the specific surface area in a range of from 7 µmol/m$^2$ to 85 µmol/m$^2$ in a polymerizable monomer having a constant polarity, the titanium oxide having a ratio of the amount of sulfonic acid group to the specific surface area in a range of from 7 µmol/m$^2$ to 85 µmol/m$^2$ is partially charge-separated state in the polymerizable monomer. In this state, it is anticipated that the dispersibility of the titanium oxide is improved by charge repulsion before a dispersant is added. If a dispersant is used for the titanium oxide receiving this stabilization effect, affinity between the titanium oxide and the dispersant is enhanced and the adsorption force of the dispersant increases so that the dispersant is not easily detached from the titanium oxide. This is considered to contribute to enhancement of dispersion stability of the titanium oxide. In addition, since the dispersion stability is excellent, the viscosity of the active energy ray curable composition does not change so much even if it is stored for a long period of time. As a consequence, discharging property is excellent.

Inorganic Pigment

Specific examples of the inorganic pigment for use in the present disclosure include, but are not limited to, carbon black, titanium oxide, and zinc oxide.

Carbon Black

The carbon black for use in the present disclosure is not particularly limited. For example, it is possible to use any of carbon black manufactured by various methods such as a channel black method, a furnace black method, and an acetylene black method. In addition, the carbon black can be any of acidic carbon, neutral carbon, and basic carbon. It is possible to use products manufactured by Mitsubishi Chemical Corporation, Degussa AG, or TOKAI CARBON CO., LTD., which are available on market.

It is suitable to use carbon black having a surface area of from 50 m$^2$/g to 280 m$^2$/g. When the specific surface area is 280 m$^2$/g or less, the particle diameter is not too small so that good dispersion stability is obtained. In addition, when the specific surface area is 50 m$^2$/g or greater, the particle diameter is not too large so that discharging stability is sufficient.

Carbon black can be surface-treated using a sulfonating agent by utilizing known methods. For example, carbon black is caused to wet-react in a solvent using a sulfonating agent. If a solvent not reactive with the sulfonating agent is selected as the dispersion solvent for the reaction system, sulfonation reaction conducted in normal organic reaction can be utilized. Specific examples of the sulfonating agents include, but are not limited to, sulfuric acid, fuming sulfuric acid, sulfur trioxide, chlorosulfuric acid, fluorosulfuric acid, and amidesulfuric acid. Of these, amidesulfuric acid is particularly preferable in terms of reactivity and dispersion stability during reaction.

Specific examples of the reaction solvent include, but are not limited to, sulfolane, dioxane, dimethyl sulfoxide, dimethylformamide, and N-methylpyrrolidone. Although the solvents used depend on the combination with the sulfonating agent, sulfolane is particularly preferable in terms of affinity with carbon black, reaction control, and dispersion stability during reaction.

The reaction between carbon black and the sulfonating agent is considered to be Friedel-Crafts reaction in which a sulfone group is introduced in an aromatic ring in the chemical structure present on the surface of a particle of carbon black. The surface-treated carbon black having a surface into which a sulfone group is introduced in this reaction is considered to improve hydrophilicity.

In addition, a hydrophilic functional group such as hydroxyl group can be also introduced into the surface of the carbon black by known oxidization treatment. Specific examples thereof include, but are not limited to, air phase oxidization in a high temperature environment, a method of using nitric acid, ozone, hydrogen peroxide solution, nitrogen oxides, or hypohalous acid salts under a wet or dry condition, and a method of using plasma treatment.

In preferred embodiments of the present disclosure, carbon black is oxidized by hypohalous acid and/or salts of hypohalous acid. Specific examples of the salts of hypohalous acid include, but are not limited to, sodium hypochlorite, potassium hypochlorite, sodium hypobromite, and potassium hypobromite. Of these, sodium hypochlorite is preferable in terms of reactivity and cost. Therefore, the surface-treated carbon black in the present disclosure is preferably obtained by oxidizing carbon black with hypohalous acid and/or salts of hypohalous acid.

Moreover, in the present disclosure, the value obtained by dividing the amount (µmol/g) of the hydrophilic functional group of carbon black by the specific surface area (m$^2$/g) of carbon black is referred to as the value of the amount of hydrophilic functional group/the specific surface area. The value of the amount of hydrophilic functional group/specific surface area is from 7 µmol/m$^2$ to 42 µmol/m$^2$ and preferably from 15 µmol/m$^2$ to 30 µmol/m$^2$. When the value is less than 7 µmol/m$^2$, the amount of hydrophilic functional group per unit area of carbon black is small, so that the dispersion stability is not easily obtained. When the value is greater than 42 µmol/m$^2$, the amount of hydrophilic functional group per unit area of carbon black is large, so that the dispersion stability is obtained before the polymeric dispersant is adsorbed to carbon black. However, steric barrier tends to occur. As a result, the amount of dispersant adsorption decreases, thereby degrading dispersion stability.

The amount of hydrophilic functional group means that the amount of hydrophilic functional group such as carboxyl group, carbonyl group, and hydroxy group are determined. In general, it can be obtained by vacuum heat decomposition gas method to measure the volatile component of carbon black. The vacuum heat decomposition gas method is described in the pages of from 69 to 74 in the Issue No. 3 (published in 1967), Vol. 88, Journal of the Chemical Society of Japan.

This method is specified as follows:

Vacuum Heat Decomposition Gas Method

The amount of hydrophilic functional group in surface-treated carbon black is measured by a vacuum heat analyzer having an electric furnace and gas chromatography. The gas chromatography employs an intermediate cell type and the first stack of the column is filled with silica gel and, the second, with molecular sieve 13X. Argon is used as carrier gas. 0.1 g to 0.5 g of carbon black as sample is weighed and charged in a quartz tube and loaded in the electric furnace. As preliminary treatment, adsorbed moisture and air are removed by evacuation at 120 degrees C. for two hours. Next, the temperature of the electric furnace is set to 200 degrees C. and kept for one hour. The gas produced during the hour is collected and the compositions of the gas are analyzed by gaschromatograph. Immediately, the temperature is set to 300 degrees C. and the gas produced similarly in the next one hour is collected for analysis. Thereafter, the produced gas for the next one hour is sequentially collected at 400 degrees C., 500 degrees C., 600 degrees C., 700 degrees C., 800 degrees C., 900 degrees C., and 1,000 degrees C. to analyze the compositions of the gas. The produced gas is mainly carbon oxide and carbon dioxide. Using the composition data of the produced gas at each temperature condition obtained as described above, the amount of the hydrophilic functional group of the surface-treated carbon black is calculated.

The specific surface area ($m^2/g$) is obtained by a method (nitrogen adsorption method) of causing carbon black to adsorb gas and calculating the specific surface area of the carbon black from the amount of adsorption and the molecular cross section in the adsorption state.

The adsorption amount of a dispersant for the carbon black is preferably 1.0 $mg/m^2$ or greater and more preferably 1.1 $mg/m^2$ or greater. When the adsorption amount of a dispersant is 1.0 $mg/m^2$ or greater, it is inferred that good dispersion stability is obtained since the amount of dispersant enough to impart steric repulsion effect is adsorbed to carbon black.

The adsorption amount of a dispersant for carbon black is evaluated as follows: A target ink is subject to centrifugal and the resultant solid portion is rinsed with acetone to extract carbon black to which only the polymeric dispersant is adsorbed. The extracted carbon black is baked at 450 degrees C. The mass decrease between before and after baking is determined as the adsorption amount. It is necessary to confirm in advance that the mass decrease of carbon black itself is very little and the state of carbon black almost remains the same under the baking condition. If the mass decrease of carbon black is confirmed, the adsorption amount is corrected considering the mass decrease.

Titanium Oxide

The titanium oxide for use in the present disclosure is not particularly limited. Products manufactured by TAYCA CORPORATION, ISHIHARA SANGYO KAISHA, LTD., or Titan Kogyo, Ltd., are available on market.

It is suitable to use titanium oxide having a surface area of from 5 $m^2/g$ to 80 $m^2/g$. When the specific surface area is 80 $m^2/g$ or less, the particle diameter is not too small so that good dispersion stability is obtained. In addition, when the specific surface area is 5 $m^2/g$ or greater, the particle diameter is not too large so that discharging stability is sufficient.

Sulfonic acid groups can be introduced into the surface of titanium oxide by utilizing known methods. Specific examples thereof include, but are not limited to, nucleophilic substitution reaction between an alkyl halogen compound having a sulfonic acid group and a hydroxy group on the surface of titanium oxide and sulfonation using sultone.

In the nucleophilic substitution reaction between an alkyl halogen compound having a sulfonic acid group and a hydroxy group on the surface of titanium oxide, one sulfonic acid group is introduced per hydroxy group on the surface of titanium oxide to form a stable covalent bond. Specific examples of the alkyl halogen compound having a sulfonic acid group include, but are not limited to, 2-chloroethane sulfonic acid and 4-chloro-1-butane sulfonic acid.

In the sulfonation reaction by sultone, no oligomer is produced and a sulfonic acid group is introduced onto the surface of titanium oxide by single stage reaction. Furthermore, non-reacted sultone is dissolved in a reactive solvent and can be removed by filtration with a reduced pressure when refining titanium oxide after sulfonic acid group is introduced.

Specific examples of sultone compounds include, but are not limited to, 1,3-propane sultone, 1,3-propene sultone, 1,4-butane sultone, and 2,4-butane sultone.

Moreover, in the present disclosure, the value obtained by dividing the amount ($\mu mol/g$) of the sulfonic acid group of titanium oxide by the specific surface area ($m^2/g$) of titanium oxide is referred to as the value of the amount of sulfonic acid group/the specific surface area. The value of the amount of sulfonic acid group/specific surface area is from 7 $\mu mol/m^2$ to 85 $\mu mol/m^2$ and preferably from 15 $\mu mol/m^2$ to 40 $\mu mol/m^2$. When the value is less than 7 $\mu mol/m^2$, the amount of sulfonic acid group per unit area of titanium oxide is small, so that the dispersion stability is not easily obtained. When the value is greater than 85 $\mu mol/m^2$, the amount of sulfonic acid group per unit area of titanium oxide is large, so that the dispersion stability is obtained before the polymeric dispersant is adsorbed to titanium oxide. However, steric barrier tends to occur. As a result, the dispersant is not easily adsorbed, thereby degrading dispersion stability.

In the present disclosure, the amount of sulfonic acid group is calculated by using Fourier Transform Infrared Spectrometer (FT-IR). The specific surface area ($m^2/g$) is obtained by a method (nitrogen adsorption method) of causing titanium oxide to adsorb gas and calculating the specific surface area of the titanium oxide from the amount of adsorption and the molecular cross section in the adsorption state.

When the value of the amount of sulfonic acid group/the specific surface area is from 7 $\mu mol/m^2$ to 85 $\mu mol/m^2$, dispersion stability is improved, thereby preventing sedimentation of titanium oxide. Moreover, even if titanium oxide settles, it is easy to disperse titanium oxide.

Polymerizable Monomer

The polymerizable monomer for use in the present disclosure is polymerized and cured upon application of an active energy ray (ultraviolet, electron beams, etc.). Two or more kinds of polymerizable monomers can be also used in combination to adjust reaction speed, ink properties, cured film properties, etc. In addition, the polymerizable monomer may be a monovalent compound or multi-valent compound.

Specific examples of the polymerizable monomer include, but are not limited to, (meth)acrylates, (meth)acrylicamides, and aromatic vinyls.

In the specification, (meth)acrylate represents either one or both acrylate and methacrylate and (meth)acrylic represents either one or both acrylic and methacrylic.

(Meth)Acrylate

Examples of the (meth)acrylates are mono-functional (meth)acrylates, bi-functional (meth)acrylates, tri-functional (meth)acrylates, tetrafunctional (meth)acrylates, pentafunctional (meth)acrylates, and hexafunctional (meth)acrylates.

Specific examples of the monofunctional (meth)acrylates include, but are not limited to, hexyl(meth)acrylate, 2-ethylhexyl(meth)acrylate, tert-octyl(meth)acrylate, isoamyl (meth)acrylate, decyl(meth)acrylate, isodecyl(meth)acrylate, stearyl(meth)acrylate, isostearyl(meth)acrylate, cyclohexyl(meth)acrylate, 4-n-butylcyclohexyl(meth)acrylate, bornyl(meth)acrylate, isobornyl(meth)acrylate, benzyl (meth)acrylate, buthoxyethyl(meth)acrylate, 2-chloroethyl (meth)acrylate, 4-bromobutyl(meth)acrylate, cyanoethyl (meth)acrylate, bithoxymethyl(meth)acrylate, 3-methoxybutyl(meth)acrylate, alkoxymethyl(meth)acrylate, alkoxyethyl(meth)acrylate, 2-(2-methoxyethoxy)ethyl (meth)acrylate, 2-(2-buthoxyethoxy)ethyl(meth)acrylate, 2,2,2-tetrafluoroethyl(meth)acrylate, 1H,1H,2H,2H-perfluorodecyl(meth)acrylate, 4-butylphenyl(meth)acrylate, phenyl (meth)acrylate, 2,4,5-tetramethylphenyl(meth)acrylate, 4-chlorophenyl(meth)acrylate, phenoxymethyl(meth)acrylate, phenoxyethyl(meth)acrylate, glycidyl(meth)acrylate, glycidyloxybutyl(meth)acrylate, glycidyloxyethyl(meth)

acrylate, glycidyloxypropyl(meth)acrylate, tetrahydofluorofurfuryl(meth)acrylate, hydroxyalkyl(meth)acrylate, 2-hydroxyethyl(meth)acrylate, 3-hydroxypropyl(meth)acrylate, 2-hydroxypropyl(meth)acrylate, 2-hydroxybutyl(meth)acrylate, 4-hydroxybutyl(meth)acrylate, dimethyl aminoethyl (meth)acrylate, diethylaminoethyl(meth)acrylate, dimethylaminopropyl(meth)acrylate, diethylaminopropyl(meth)acrylate, trimethoxysilylpropyl(meth)acrylate, trimethylsilylpropyl(meth)acrylate, polyethyleneoxidemonomethylether(meth)acrylate, oligoethyleneoxide monomethylether(meth)acrylate, polyethyleneoxide(meth)acrylate, oligoethyleneoxide(meth)acrylate, oligoethyleneoxide monoalkylether(meth)acrylate, polyethyleneoxidemonoalkylether(meth)acrylate, dipropyleneglycol(meth)acrylate, polypropyleneoxide monoalkylether(meth)acrylate, oligopropyleneoxide monoalkylether(meth)acrylate, 2-methacryloyloxyethyl succinic acid, 2-methacryloyloxyhexahydro phthalic acid, 2-methacryloyloxyethyl-2-hydroxypropylene phthalate, buthoxydiethylene glycol(meth)acrylate, trifluoroethyl(meth)acrylate, perfluorooctylethyl(meth)acrylate, 2-hydroxy-3-penoxypropyl(meth)acrylate, ethylene oxide-modified phenol(meth)acrylate, ethyleneoxide-modified cresol (meth)acrylate, ethylene oxide-modified nonylphenol (meth)acrylate, propylene oxide-modified nonylphenol (meth)acrylate, ethylene oxide-modified-2-ethylhexyl (meth)acrylate, and 2-(2-vinyloxyethoxy)ethyl acrylate. These can be used alone or in combination.

Of these, in terms of low viscosity, faint smell, and high level of curability, 2-(2-vinyloxyethoxy)ethyl acrylate, 2-hydroxyethyl(meth)acrylate, 3-hydroxypropyl(meth)acrylate, 2-hydroxypropyl(meth)acrylate, and 4-hydroxybutyl(meth)acrylate are preferable. 2-(2-vinyloxyethoxy) ethyl acrylate are particularly preferable in terms of compatibility with photopolymerization initiators and other monomers.

Specific examples of the bifunctional (meth)acrylates include, but are not limited to, 1,6-hexanediol di(meth)acrylate, 1,10-decanediol di(meth)acrylate, neopentyl glycol di(meth)acrylate, 2,4-dimethyl-1,5-pentanediol di(meth)acrylate, butylethylpropane diol di(meth)acrylate, ethoxylated cyclohexanemethanol di(meth)acrylate, polyethylene glycol di(meth)acrylate, oligoethyleneglycol di(meth)acrylate, ethylene glycol di(meth)acrylate, 2-ethyl2-butyl-butanediol di(meth)acrylate, hydroxy pivalic acid neopentyl glycol di(meth)acrylate, EO-modified bisphenol A di(meth)acrylate, bisphenol F polyethoxy di(meth)acrylate, polypropylene glycol di(meth)acrylate, oligopropylene glycol di(meth)acrylate, 1,4-butanediol di(meth)acrylate, 2-ethyl-2-butylpropanediol di(meth)acrylate, 1,9-nonane di(meth)acrylate, propoxylated ethoxylated bisphenol A di(meth)acrylate, and tricyclodecane di(meth)acrylate. These can be used alone or in combination.

Specific examples of the trifunctional (meth)acrylates include, but are not limited to, trimethylolpropane tri(meth)acrylate, trimethylolethane tri(meth)acrylate, alkyleneoxide-modified (meth)acrylate of trimethylol propane, pentaerythritol tri(meth)acrylate, dipenraerythritol tri(meth)acrylate, trimethylolpropane tri{(meth)acryloyloxypropyl}ether, isocyanuric acid alkylene oxide-modified tri(meth)acrylate, tri{(meth)acryloyloxyethyl}isocyanulate, hydroxypival aldehyde-modified dimethylol propane tri(meth)acrylate, sorbitoltri(meth)acrylate, propoxylated trimethylol propane tri(meth)acrylate, and ethoxylated glycerin tri(meth)acrylate, These can be used alone or in combination.

Specific examples of the tetrafunctional (meth)acrylates include, but are not limited to, pentaerythritol tetra(meth)acrylate, sorbitol tetra(meth)acrylate, ditrimethylol propanetetra(meth)acrylate, dipentaerythritol tetra(meth)acrylate propionate, and ethoxylated pentaerythritol tetra(meth)acrylate. These can be used alone or in combination.

Specific examples of the pentafunctional (meth)acrylates include, but are not limited to, sorbitol penta(meth)acrylate and dipentaerythritol penta(meth)acrylate.

Specific examples of the hexafunctional (meth)acrylates include, but are not limited to, dipentaerythritol hexa(meth)acrylate, sorbitol hexa(meth)acrylate, alkyleneoxide-modified hexa(meth)acrylate of phosphazene, and caprolactone-modified dipentaerythritol hexa(meth)acrylate.

(Meth)acrylic Amide

Specific examples of (meth)acrylic amides include, but are not limited to, (meth)acrylic amide, N-methyl(meth)acrylic amide, -ethyl(meth)acrylic amide, N-propyl(meth)acrylic amide, N-n-butyl(meth)acrylic amide, N-t-butyl (meth)acrylic amide, N-buthoxymethyl(meth)acrylic amide, N-isopropyl(meth)acrylic amide, N-methylol(meth)acrylic amide, N,N-dimethyl(meth)acrylic amide, N,N-diethyl (meth)acrylic amide, (meth)acryloyl morpholine, and hydroxyethyl(meth)acrylic amide. These can be used alone or in combination.

Aromatic Vinyl

Specific examples of aromatic vinyl include, but are not limited to, styrene, methylstyrene, dimethylstyrene, trimethylstyrene, ethylstyrene, isoproyplstyrene, chlormethylstyrene, methoxy styrene, acetoxystyrene, chlorstyrene, dichlorstyrene, bromstyrene, vinylbenzoate methyl styrene, 3-methyl styrene, 4-methyl styrene, 3-ethyl styrene, 4-ethylstyrene, 3-propylstyrene, 4-propylstyrene, 3-butylstyrene, 4-butylstyrene, 3-hexylstyrene, 4-hexylstyrene, 3-octylstyrene, 4-octylstyrene, 3-(2-ethylhexyl)styrene, 4-(2-ethylhexyl)styrene, allylstyrene, isopropenylstyrene, butenylstyrene, octenylstyrene, 4-t-buthoxycarbonyl styrene, 4-methoxystyrene, and 4-t-buthoxystyrene. These can be used alone or in combination.

The content of the polymerizable monomer is not particularly limited and can be determined to a particular application. It is preferably from 50 percent by mass to 95 percent by mass, more preferably from 60 percent by mass to 92 percent by mass, and furthermore preferably from 70 percent by mass to 90 percent by mass to the total content of the active energy ray curable composition.

It is preferable to use a low viscous monofunctional monomer having a solubility parameter (SP) value of 9.5 or higher as the dispersion medium for use in dispersion of a surface-treated inorganic pigment. The present disclosure is not limited to monofunctional monomers. However, in terms of ameliorating dispersibility, low viscosity is preferable. Monofunctional monomers are particularly preferable because they have low viscosity. That the SP value is 9.5 or higher is considered to make contribution to improvement of adsorption affinity between a pigment and a dispersant, thereby ameliorating dispersion stability. Furthermore, a polymerizable monomer having an SP value of 10 or higher is preferable. The upper limit of the SP value is not particularly limited. However, if the SP value is excessively high, the inner agglomeration force becomes strong. Therefore, the SP value is preferably 24 or less. Of the monofunctional monomers, the monomer represented by Chemical formula M-1, M-2, or M-3 is more preferable to obtain a liquid dispersion having excellent dispersion stability. It is possible to use the following products.

M-1: phenoxyethylacrylate (VISCOAT® #192: SP value: 10.12, manufactured by OSAKA ORGANIC CHEMICAL INDUSTRY LTD.)

Chemical formula M-1

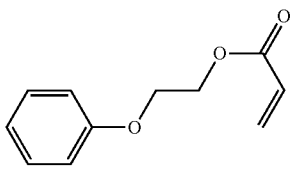

(M-1)

M-2: acryloylmorpholine (ACMO: SP value 22.90, manufactured by KOHJIN Film & Chemicals Co., Ltd.)

Chemical formula M-2

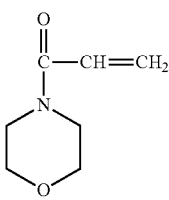

(M-2)

M-3: Benzylacrylate (VISCOAT® #160: SP value: 10.14, manufactured by OSAKA ORGANIC CHEMICAL INDUSTRY LTD.)

Chemical formula M-3

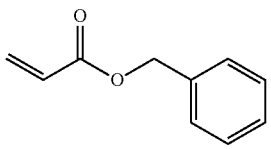

(M-3)

The SP value in this specification represents the calculation value calculated according to Fedors relation: $\delta^2 = \Sigma E / \Sigma V$ (where, $\delta$ represents SP value, E represents evaporation energy, and V represents mol volume). The unit of the SP value is $(cal/cm^3)^{0.5}$. The method of Fedors is described on page p 566, issue No. 22 of Journal of the Adhesion Society of Japan, published in 1986.

Polymeric Dispersant

As the polymeric dispersant, known polymeric dispersants can be used such as esters of carboxylic acid having a hydroxy group, salts of esters of long chain polyaminoamide and high-molecular weight acids, salts of high-molecular weight polycarboxylic acid, salts of esters of long-chain polyaminoamide and a polar acid, high-molecular weight unsaturated acid esters, modified polyurethane, modified polyacrylate, polyether ester type anion-based active agent, naphthalene sulfonic acid formaline condensed salts, polyoxyethylene alkyl phosphorates, polyoxyethylene nonylphenylether, polyester polyamine, and stearylamine acetate.

As for low molecular weight dispersants, since steric barrier effects caused by dispersant adsorption is insufficient, high level of dispersion stability is not expected in comparison with polymeric dispersants. The polymeric dispersant for use in the present disclosure represents those having a weight average molecular weight of 10,000 or greater.

Polymeric dispersants have basic polar functional groups, which makes it possible to manufacture an ink that is easily adsorbed to inorganic pigments having sulfonated surfaces and has good dispersion stability.

In addition, examples of the polar basic functional group are amino group, imino group, amide group, imide group, and nitrogen-containing heterocyclic groups. Of these, amino group is preferable because it has a high adsorption power, good dispersibility in a polymerizable monomer, and a high level of viscosity lowering power.

The amino value of the polymeric dispersant for use in the present disclosure is preferably in the range of from 10 mgKOH/g to 30 mgKOH/g. When the amine value is within the range specified above, inferentially, dispersant adsorption power is high and promotion of polymerizable reaction with a polymerizable monomer as ink components is inhibited when an ink is stored for a long period of time or heated. As a result, the viscosity does not change so much when stored for a long period of time or heated so that a high level of storage stability is inferentially obtained. The amine value is more preferably from 15 mgKOH/g to 30 mgKOH/g.

The addition amount of a dispersant to carbon black is preferably in the range of from 10 percent by mass to 50 percent by mass. When the addition amount is 10 percent by mass or more, a sufficient amount of a dispersant is adsorbed to stabilize dispersion. When the addition amount is 50 percent by mass or less, the amount of isolated dispersant, which is not adsorbed to a pigment, is small so that an impact on viscosity increase or discharging property is inferred to be small. The addition amount is more preferably from 20 percent by mass to 35 percent by mass.

The addition amount of a dispersant to titanium oxide is preferably in the range of from 5 percent by mass to 15 percent by mass to a pigment. When the addition amount is 5 percent by mass or more, a sufficient amount of a dispersant is adsorbed to stabilize dispersion. When the addition amount is 15 percent by mass or less, the amount of isolated dispersant, which is not adsorbed to a pigment, is small so that an impact on viscosity increase or discharging property is inferred to be small. The addition amount is more preferably from 6 percent by mass to 10 percent by mass.

Specific examples of such polymeric dispersants include, but are not limited to, products available on market such as Solsperse Series (manufactured by The Lubrizol Corporation) including Solsperse 5000, Solsperse 12000, Solsperse 22000, Solsperse 24000, Solsperse 32000, Solsperse 39000, Solsperse J100, and Solsperse J200, DisperBYK series (manufactured by BYK Japan KK.) including DisperBYK-162, DisperBYK-163, DisperBYK-168, DisperBYK-2150, and DisperBYK-2200, BYKJET series (manufactured by BYK Japan KK.) including BYKJET-9151 and BYKJET-9152, and AJISPER series (manufactured by Ajinomoto Fine-Techno Co., Inc.) including AJISPER PB821, AJISPER PB822 and AJISPER-PB881.

Organic Solvent

The active energy ray curable composition of the present disclosure optionally contains an organic solvent although it is preferable to be free of it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethylacetate, cyclohexanone, and toluene, which is clearly distinguished from reactive monomers. Furthermore, "free of" an organic solvent means that no organic solvent is substantially contained. The content thereof is preferably less than 0.1 percent by weight.

Active Energy Ray

Active energy rays for use in curing an active energy ray curable composition of the present disclosure are not particularly limited, for example, they are preferred when they can impart energy to conduct polymerization reaction of polymerizable components in the curable composition.

Specific examples thereof include, but are not limited to, electron beams, a ray, B ray, γ ray, and X ray, in addition to ultraviolet rays. Preferably, in another embodiment, a particularly high energy light source obviates the need for a polymerization initiator to proceed reaction. In addition, in the case of irradiation with ultraviolet ray, mercury-free is strongly preferred in terms of protection of environment. Therefore, replacement with GaN-based ultraviolet light-emitting devices is preferred from industrial and environmental point of view. Furthermore, ultraviolet light-emitting diode (UV-LED) and ultraviolet laser diode (UV-LD) are preferable.

Small size, long working life, high efficiency, and high cost performance make such irradiation sources desirable.

Polymerization Initiator

The active energy ray curable composition of the present disclosure optionally contains a polymerization initiator. The polymerization initiator produces active species such as a radical or a cation upon application of energy of an active energy ray and initiates polymerization of a polymerizable compound (monomer or oligomer). As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5 percent by weight to 20 percent by weight of the total content of the composition (100 percent by weight) to obtain sufficient curing speed.

Specific examples of the radical polymerization initiators include, but are not limited to, aromatic ketones, acylphosphineoxide compounds, aromatic oniumchlorides, organicperoxides, thio compounds (thioxanthone compounds, thiophenyl group containing compounds, etc.), hexaarylbiimidazole compounds, ketoxime-esterified compounds, borate compounds, azinium compounds, metallocene compounds, active ester compounds, compounds having a carbon halogen bond, and alkylamine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyldimethanolamine, triethanolamine, p-diethyl aminoacetophenone, p-dimethylaminoethylbenzoate, p-dimethyl aminobenzoate-2-ethylhexyl, N,N-dimethylbenzylamine and 4,4'-bis(diethylamino)benzophenone. The content of the polymerization accelerator is determined depending on the polymerization initiator of the polymerization initiator and the amount of polymerization initiator used in combination with the polymerization accelerator.

Amine compounds can be used in combination as an polymerization accelerator. Specific examples thereof include, but are not limited to, p-dimethylamino ethylbenzoate, p-dimethyl amino-2-ethylhexylbenzoate, p-dimethyl amino methylbenzoate, 2-dimethylaminoethyl benzoate, and p-dimethyl butoxyethylaminobenzoate.

Specific examples of such radical polymerization inhibitors include, but are not limited to, typically used known radical polymerization inhibitors such as 4-methoxy-1-naphthol, methyl hydroquinone, hydroquinone, methoquinone, t-butyl hydroquinone, di-t-butyl hydroquinone, phenothiazine, 2,2'-dihydroxy-3,3'-di(α-methylcyclohexyl)-5,5'-dimethyldiphenyl methane, p-benzoquinone, di-t-butyl diphenyl amine, 9,10-di-n-buthoxycyan anthracene, and 4,4'-[1,10-di oxo-1,10-decane diylbis(oxy)]bis[2,2,6,6-tetramethyl]-1-piperidinyloxy.

Property of Composition

The composition of the present disclosure preferably has a surface tension of from 20 mN/m to 29 mN/m at the temperature at the time of discharging.

In addition, the viscosity change rate (ΔV) based on the relation 1 is preferably in the range of from −10 percent to +10 percent and more preferably from −5 percent to +5 percent. This viscosity change rate (ΔV) is an indicator of the stability of a composition. As ΔV approaches to zero, the composition is stabilized. When ΔV>0 is compared with ΔV<0, ΔV<0 is preferable. With regard to the viscosity change rate (ΔV), the change for increase (viscosity increase) is inferred to be caused by increase of bound solvent accompanied by agglomeration of pigment particles, and the change for decrease (viscosity decrease) is inferred to be caused by promotion of adsorption of a dispersant to pigment particles due to aging effect, thereby stabilizing dispersion.

Other Components

The active energy ray curable type composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, penetration-enhancing agents, fixing agents, viscosity stabilizers, fungicide, preservatives, antioxidants, ultraviolet absorbents, chelate agents, pH adjusters (regulators), and thickeners.

Preparation of Active Energy Ray Curable Composition

The active energy ray curable composition of the present disclosure can be prepared by using the components described above. The preparation devices and conditions are not particularly limited. For example, the curable composition can be prepared by charging a polymerizable monomer, a pigment, a dispersant, etc., into a dispersing machine such as a ball mill, a kitty mill, a disk mill, a pin mill, and a DYNO-MILL to prepare a pigment liquid dispersion followed by mixing with a polymerizable monomer, an initiator, a polymerization initiator, and a surfactant.

Viscosity

The viscosity of the active energy ray curable composition of the present disclosure has no particular limit because it can be adjusted depending on the purpose and application devices. For example, if a discharging device that discharges the composition from nozzles is employed, the viscosity thereof is preferably in the range of from 3 mPa·s to 40 mPa·s, more preferably from 5 mPa·s to 15 mPa·s, and particularly preferably from 6 mPa·s to 12 mPa·s in the temperature range of from 20 degrees C. to 65 degrees C., preferably at 25 degrees C. In addition, it is particularly preferable to satisfy this viscosity range by a composition free of the organic solvent mentioned above. The viscosity can be measured by a cone-and-plate type rotary viscometer (VISCOMETER TVE-22L, manufactured by TOKI SANGYO CO., LTD.) using a cone rotor (1°34'×R24) at a number of rotation of 50 rpm with a setting of the temperature of hemathermal circulating water in the range of from 20 degrees C. to 65 degrees C. VISCOMATE VM-150III can be used for the temperature adjustment of the circulating water.

Application Field

The application field of the active energy ray curable composition of the present disclosure is not particularly limited. It can be applied to any field where the active energy ray curable composition is used. For example, the curable composition is selected to a particular application and used for a resin for molding, a paint, an adhesive, an insulant, a release agent, a coating material, a sealing material, various resists, and various optical materials.

Figure 2:
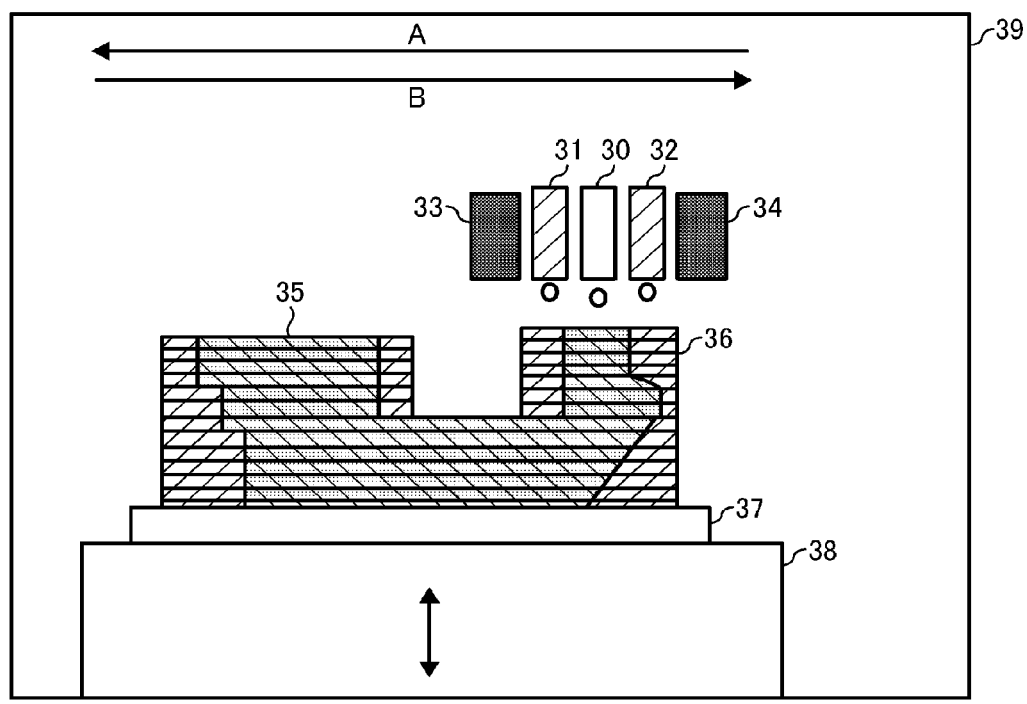
FIG. 2 is a schematic diagram illustrating an example of a three-dimensional image forming apparatus according to an embodiment of the present disclosure.
Figure 3A:
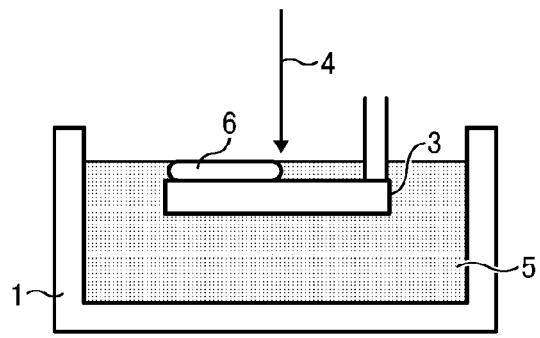
FIGS. 3A, 3B, 3C, and 3D are each a schematic diagram illustrating another example of the three-dimensional image forming apparatus according to an embodiment of the present disclosure.
Figure 3B:
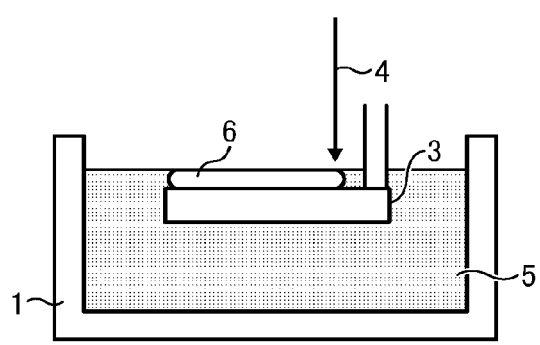
Figure 3C:
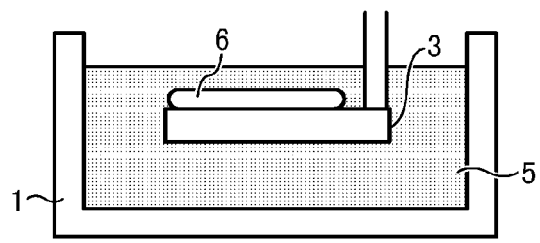
Figure 3D:
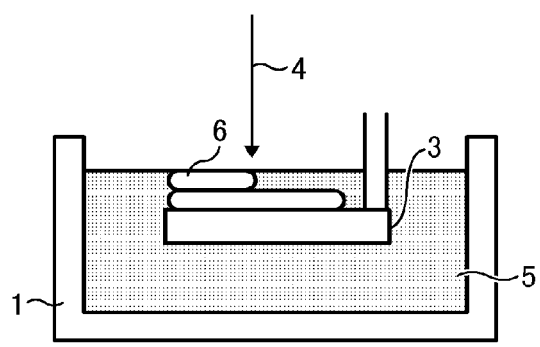

Furthermore, the active energy ray curable composition of the present disclosure can be used as an ink to form two-dimensional texts, images, and designed coating film on various substrates and in addition as a solid object forming material to form a three-dimensional object. This material for a three-dimensional object can be used as a binder for powder particles for use in powder additive manufacturing to form a solid object by repeating curing and laminating powder layers. Also, it can be used as a solid object constituting material (model material) or supporting member (supporting material) for use in additive manufacturing (rapid prototyping) as illustrated in FIG. 2, FIG. 3A, FIG. 3B, FIG. 3C, and FIG. 3D. Incidentally, FIG. 2 is a diagram illustrating a method of additive manufacturing to sequentially form thin layers of the active energy ray curable type composition of the present disclosure one on top of the other by repeating ejecting, curing, and laminating the curable type composition. FIG. 3 is a diagram illustrating a method of additive manufacturing to sequentially form cured layers 6 one on top of the other having respective predetermined forms on a movable stage 3 by irradiating with the active energy ray 4 a reservoir (storing unit) 1 of the active energy ray curable type composition 5 of the present disclosure.

An apparatus for fabricating a three-dimensional object by the active energy ray curable composition of the present disclosure is not particularly limited and can be a known apparatus.

For example, the apparatus includes an accommodating device, a supplying device, and a discharging device of the curable composition, and an active energy ray irradiator.

In addition, the present disclosure includes cured materials obtained by curing the active energy ray curable composition and structures formed of the cured materials and a substrate on which the cured materials are formed. The structure can be processed to obtain a processed product. The processed product is fabricated by, for example, forming processing such as heating drawing and punching of cured materials and structures having a sheet-like form or film-like form.

These are suitably used for, for example, gauges or operation panels of vehicles, office machines, electric and electronic machines, and cameras, which requires processing the surface after decorating.

The substrate is not particularly limited. It can suitably be selected to a particular application. Specific examples thereof include, but are not limited to, paper, fiber, fabrics, leather, metal, plastic, glass, wood, ceramic, or composite materials thereof. Of these, plastic substrates are preferred in terms of processability.

Composition Stored Container

The composition stored container of the present disclosure contains the active energy ray curable composition and is suitable for the applications as described above. For example, if the active energy ray curable composition of the present disclosure is for ink, a container storing the ink can be used as in a form of an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

Image Forming Method and Image Forming Apparatus

The image forming method of the present disclosure includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part storing the active energy ray curable composition of the present disclosure. The storing part may include the container mentioned above. Furthermore, the method and the apparatus optionally include a discharging step and a discharging device to discharge the active energy ray curable composition, respectively. The method of discharging the curable composition is not particularly limited, and examples thereof include a continuous spraying method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 23a, 23b, 23c, and 23d having ink cartridges and discharging heads for yellow, magenta, cyan, and black active energy ray curable inks, respectively discharge the inks onto a recording medium 22 fed from a supplying roller 21. Thereafter, light sources 24a, 24b, 24c, and 24d emit active energy rays to cure the inks to form a color image. Thereafter, the recording medium 22 is transferred (conveyed) to a processing unit 25 and a printed matter reeling roll 26. Each of the printing unit 23a, 23b, 23c and 23d optionally has a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method can be any of a serial method of discharging an ink onto a recording medium that is intermittently moving to the width of a discharging head by moving the head or a line method of discharging an ink onto a recording medium that is moving continuously from a discharging head held at a fixed position.

The recording medium 22 is not particularly limited. Specific examples thereof include, but are not limited to, paper, film, metal, or complex materials thereof. The recording medium 22 takes a sheet-like form but is not limited thereto. The image forming apparatus may have a one-side printing configuration or a two-side printing configuration.

Optionally, multiple colors can be printed with no or faint active energy ray from the light sources 24a, 24b, and 24c followed by irradiation of the active energy ray from the light source 24d. As a result, energy and cost can be saved.

The recorded matter on which images are printed with the ink of the present disclosure includes articles having images or texts on a plain surface of conventional paper, resin film, etc. a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a three dimensional object) of the present disclosure. An image forming apparatus 39 illustrated in FIG. 2 sequentially forms layers one on top of the other using a head unit having inkjet heads arranged movable in the directions indicated by the arrows A and B while discharging a first active energy ray curable composition from a discharging head unit 30 for additive manufacturing and a second active energy ray curable composition composed of different ingredients from the first active energy ray curable composition from discharging head units 31 and 32 for support and curing these compositions by ultraviolet irradiators 33 and 34 adjacent to the discharging head units 31 and 32. To be more specific, for example, after the discharging head units 31 and 32 for support discharge the second active energy ray curable composition onto a substrate 37 for additive manufacturing and the second active energy ray curable composition is solidified by irradiation of an active energy ray to form a first substrate layer having a hollow space for fabrication, the discharging head unit 30 for additive manufacturing discharges the first active energy ray curable composition onto the hollow space followed by irradiation of an active energy ray for solidification, thereby to form a first additive manufacturing layer. This step is repeated multiple times lowering the stage 38 movable in the vertical direction to laminate the supporting layer and the additive manufacturing layer to fabricate a three dimensional object 35. Thereafter, an additive manufacturing support 36 is removed, if desired. Although only a single discharging head unit 30 for additive manufacturing is provided in FIG. 2, the apparatus can have two or more units 30.

Having generally described preferred embodiments of this invention, further understanding can be obtained by reference to certain specific examples which are provided herein for the purpose of illustration only and are not intended to be limiting. In the descriptions in the following examples, the numbers represent weight ratios in parts, unless otherwise specified.

EXAMPLES

The present invention is described in detail with reference to the Examples but not limited to the following Examples.

"Parts" represents parts by weight unless otherwise specified.

First, Examples 1 to 10 and Comparative Examples 1 to 4 describe cases in which the inorganic pigment is carbon black.

Preparation of Sulfonation-Treated Carbon Black
Preparation of Surface Treated CB1

100 g of carbon black pigment #40 (manufactured by Mitsubishi Chemical Corporation) was mixed with 150 ml of sulfolan followed by fine dispersion by a ball mill using zirconia beads having a diameter of 2 mm. Thereafter, 5 g of amide sulfate was added followed by stirring at 140 degrees C. to 150 degrees C. for ten hours. The thus-obtained liquid dispersant was filtered by a glass filter and thereafter rinsed with deionized water. The thus-obtained carbon black wet cake having a sulfonation-treated surface was re-dispersed in 1,000 mL of deionized water and refined by reverse osmosis membrane until the ionization degree thereof reached 40 µS/cm followed by drying sufficiently. The thus-obtained carbon black having a sulfonation-treated surface was referred to as [Surface treated CB1].

The amount of the hydrophilic functional group of [Surface treated CB1] was 208 µmol/g when measured by vacuum heat decomposition gas method. When this value was divided by the specific surface area 115 $m^2/g$ of carbon black #40, the result was 18.1 $\mu mol/m^2$. The obtained data are shown in Table 1.

Preparation of Surface Treated CB2 to CB5

Similarly, the carbon blacks shown in Table 1 were subject to sulfonation treatment under the surface treatment condition shown in Table 1 to obtain [Surface treated CB2] to [Surface treated CB5].

The amount of hydrophilic functional group and the specific surface area of [Surface treated CB2] to [Surface treated CB5] were measured in the same manner as in [Surface treated CB1] to calculate the value of the amount of hydrophilic functional group to specific surface area. The obtained data are shown in Table 1.

Preparation of Carbon Black Surface-treated by Oxidization
Preparation of Surface Treated CB6

The carbon black shown in Table 1 was subject to oxidization treatment by sodium hypochlorite under the surface treatment condition shown in Table 1 to obtain [Surface treated CB6].

The oxidization by sodium hypochlorite was conducted as follows:

300 g of carbon black pigment #2600 (manufactured by Mitsubishi Chemical Corporation) was mixed with 1,000 mL of water and thereafter 450 g of sodium hypochlorite (effective chlorine concentration of 12%) was dripped to the mixture followed by stirring at 90 degrees C. to 100 degrees C. for four hours. The thus-obtained liquid dispersant was filtered by a glass filter and thereafter rinsed with deionized water. The thus-obtained oxidization-treated carbon black wet cake was re-dispersed in 1,000 mL of deionized water and refined by reverse osmosis membrane until the ionization degree thereof reached 40 µS/cm followed by drying sufficiently. The thus-obtained surface-treated carbon black was referred to as [Surface treated CB6].

Preparation of Surface Treated CB7

[Surface treated CB7] was obtained in the same manner as in preparation of [Surface treated CB6] except that the stirring was conducted at 90 degrees C. to 100 degrees C. for ten hours.

Preparation of Surface Treated CB8

[Surface treated CB8] was obtained by leaving carbon black pigment #40 (manufactured by Mitsubishi Chemical Corporation) in the air followed by heating at 300 degrees C. for three hours. The amount of the hydrophilic functional group of [Surface treated CB8] was 940 µmol/g when measured by vacuum heat decomposition gas method. When this value was divided by the specific surface area 115 $m^2/g$ of carbon black #40, the result was 8.2 $\mu mol/m^2$.

The amount of hydrophilic functional group and the specific surface area of [Surface treated CB6] to [Surface treated CB8] were measured in the same manner as in [Surface treated CB1] to calculate the value of the amount of hydrophilic functional group to the specific surface area. The obtained data are shown in Table 1.

Non-surface-treated carbon black pigment #40 (manufactured by Mitsubishi Chemical Corporation) was determined as [Non-surface-treated CB9]. The data of the amount of hydrophilic functional group and the rate of the amount of hydrophilic functional group to the specific surface area of [Surface treated CB6] are shown in Table 1.

TABLE 1

| | CB No. | Specific surface area m²/g | Surface treatment condition | Amount of hydrophilic functional group (μmol/g) | Amount of hydrophilic functional group to specific surface area (μmol/m²) |
|---|---|---|---|---|---|
| Surface treated CB1 | Mitsubishi Chemical Corporation #40 | 115 | Sulfolan/amide sulfide/140 degrees C. to 150 degrees C./10 hours | 2080 | 18.1 |
| Surface treated CB2 | Mitsubishi Chemical Corporation #970 | 260 | Sulfolan/amide sulfide/140 degrees C. to 150 degrees C./12 hours | 3620 | 13.9 |
| Surface treated CB3 | Degussa SB250 | 40 | Sulfolan/amide sulfide/140 degrees C. to 150 degrees C./8 hours | 1240 | 31.0 |
| Surface treated CB4 | Mitsubishi Chemical Corporation #25 | 55 | Sulfolan/amide sulfide/140 degrees C. to 150 degrees C./14 hours | 2220 | 40.4 |
| Surface treated CB5 | Degussa FW18 | 260 | Sulfolan/amide sulfide/140 degrees C. to 150 degrees C./12 hours | 2320 | 8.9 |
| Surface treated CB6 | Mitsubishi Chemical Corporation #2600 | 370 | Water/sodium hypochlorite/90 degrees C. to 100 degrees C./4 hours | 1910 | 5.2 |
| Surface treated CB7 | Degussa PrintexU | 110 | Water/sodium hypochlorite/90 degrees C. to 100 degrees C./10 hours | 4870 | 44.3 |
| Surface treated CB8 | Mitsubishi Chemical Corporation #40 | 115 | In the air 300 degrees C./3 hours | 940 | 8.2 |
| Non-surface-treated CB9 | Mitsubishi Chemical Corporation #40 | 115 | No surface treated | 420 | 3.7 |

Preparation of Liquid Dispersion of Carbon Black

Preparation of Liquid Dispersion 1 of Carbon Black 18 parts of a dispersant (BYKJET-9151, manufactured by BYK Japan K.K.) was charged in 162 parts of VISCOAT® #192 (Chemical formula M-1, SP value: 10.12) followed by stirring for dissolution at 40 degrees C. for two hours to manufacture a dispersion medium.

80 parts of zirconia ball having a diameter of 2 mm, 4.5 parts of [Surface-treated CB1] manufactured in the Preparation Example, and 18 parts of the dispersion medium prepared as described above were placed in a 70 mL bottle of mayonnaise followed by dispersion by a ball mill for three days to prepare [Liquid dispersion 1 of carbon black].

Media: YTZ ball: diameter 2 mm (zirconia ball, manufactured by NIKKATO CORPORATION)

Mill: MIX-ROTAR VMR-5 (manufactured by AS ONE Corporation)

Number of rotation: 75 rpm (number of rotation of bottle)

Preparation of Liquid Dispersions 2 to 14 of Carbon Black

Liquid dispersions 2 to 14 of carbon black were prepared in the same manner as in preparation of the liquid dispersion 1 of carbon black using [Surface treated CB1] to [Surface treated CB8] and [Non-surface treated CB9] and dispersants and monomers shown in Table 2.

Measuring of Amine Value of Dispersant

The amine value of the dispersant was measured as follows.

1 g of a dispersant was dissolved in 100 mL of methyl isobutyl ketone and the solution was subject to potentiometric titration by 0.01 mol/L methyl isobutyl ketone chlorate solution. The amine value was determined as the value in KOHmg/g conversion. Potentiometric titration was conducted using an automatic titration instrument (GT-200, manufactured by Mitsubishi Chemical Analytech Co., Ltd.).

TABLE 2

| Liquid dispersion of carbon black | Surface Treated CB | Dispersant/Amine value KOHmg/g | Monomer/SP value |
|---|---|---|---|
| Liquid dispersion 1 of carbon black | Surface treated CB1 | BYKJET-9151/17.2 | VISCOAT® #192/10.12 |

TABLE 2-continued

| Liquid dispersion of carbon black | Surface Treated CB | Dispersant/Amine value KOHmg/g | Monomer/SP value |
|---|---|---|---|
| Liquid dispersion 2 of carbon black | Surface treated CB1 | Solsperse 39000/25.9 | VISCOAT ® #160/10.14 |
| Liquid dispersion 3 of carbon black | Surface treated CB1 | BYKJET-9151/17.2 | ACMO/22.90 |
| Liquid dispersion 4 of carbon black | Surface treated CB2 | Solsperse 39000/25.9 | VISCOAT ® #150/9.62 |
| Liquid dispersion 5 of carbon black | Surface treated CB3 | BYKJET-9151/17.2 | ACMO/22.90 |
| Liquid dispersion 6 of carbon black | Surface treated CB4 | BYK-9077/45.1 | VISCOAT ® #155/9.26 |
| Liquid dispersion 7 of carbon black | Surface treated CB5 | BYK-9077/45.1 | VISCOAT ® #192/10.12 |
| Liquid dispersion 8 of carbon black | Surface treated CB8 | BYKJET-9151/17.2 | ACMO/22.90 |
| Liquid dispersion 9 of carbon black | Surface treated CB8 | BYKJET-9151/17.2 | VISCOAT ® #150/9.62 |
| Liquid dispersion 10 of carbon black | Surface treated CB2 | DISPERBYK-108/70.2 | VISCOAT ® #150/9.62 |
| Liquid dispersion 11 of carbon black | Surface treated CB6 | BYK-9077/45.1 | VISCOAT ® #160/10.14 |
| Liquid dispersion 12 of carbon black | Surface treated CB7 | BYK-9077/45.1 | VISCOAT ® #192/10.12 |
| Liquid dispersion 13 of carbon black | Surface treated CB2 | BYK-9077/45.1 | VISCOAT ® #155/9.26 |
| Liquid dispersion 14 of carbon black | Non-surface-treated CB9 | BYK-9077/45.1 | VISCOAT ® #160/10.14 |

Example 1

An ink of Example 1 was manufactured by preparing the following recipe.

| | |
|---|---|
| Liquid dispersion 1 of carbon black: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 2

An ink of Example 2 was manufactured by preparing the following recipe.

| | |
|---|---|
| Liquid dispersion 2 of carbon black: | 50 parts |
| Mono-functional monomer VISCOAT ® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 3

An ink of Example 3 was manufactured by preparing the following recipe.

| | |
|---|---|
| Liquid dispersion 3 of carbon black: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 4

An ink of Example 4 was manufactured by preparing the following recipe.

| | |
|---|---|
| Liquid dispersion 4 of carbon black: | 50 parts |
| Mono-functional monomer VISCOAT ® #150 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 5

An ink of Example 5 was manufactured by preparing the following recipe.

| | |
|---|---|
| Liquid dispersion 5 of carbon black: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 6

An ink of Example 6 was manufactured by preparing the following recipe.

| | |
|---|---|
| Liquid dispersion 6 of carbon black: | 50 parts |
| Mono-functional monomer VISCOAT ® #155 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 7

An ink of Example 7 was manufactured by preparing the following recipe.

| | |
|---|---|
| Liquid dispersion 7 of carbon black: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 8

An ink of Example 8 was manufactured by preparing the following recipe.

| | |
|---|---|
| Liquid dispersion 8 of carbon black: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 9

An ink of Example 9 was manufactured by preparing the following recipe.

| | |
|---|---|
| Liquid dispersion 9 of carbon black: | 50 parts |
| Mono-functional monomer VISCOAT ® #150 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 10

An ink of Example 10 was manufactured by preparing the following recipe.

| | |
|---|---|
| Liquid dispersion 10 of carbon black: | 50 parts |
| Mono-functional monomer VISCOAT ® #150 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 1

An ink of Comparative Example 1 was manufactured by preparing the following recipe.

| | |
|---|---|
| Liquid dispersion 11 of carbon black: | 50 parts |
| Mono-functional monomer VISCOAT ® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |

-continued

| | |
|---|---|
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 2

An ink of Comparative Example 2 was manufactured by preparing the following recipe.

| | |
|---|---|
| Liquid dispersion 12 of carbon black: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 3

An ink of Comparative Example 3 was manufactured by preparing the following recipe.

| | |
|---|---|
| Liquid dispersion 13 of carbon black: | 50 parts |
| Mono-functional monomer VISCOAT ® #155 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 4

An ink of Comparative Example 4 was manufactured by preparing the following recipe.

| | |
|---|---|
| Liquid dispersion 14 of carbon black: | 50 parts |
| Mono-functional monomer VISCOAT ® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Evaluation on Adsorption Amount of Dispersant for Carbon Black

The ink of Examples 1 to 10 and Comparative Examples 1 to 4 were subject to centrifugal and the resultant solid portion was rinsed with acetone to take out carbon black to which only the polymeric dispersant was adsorbed. The thus-obtained carbon black was baked at 450 degrees C. The mass decrease between before and after baking was determined as the adsorption amount.

It was confirmed that the mass decrease of carbon black itself was very little under the baking condition and the state of carbon black almost remained the same. However, the adsorption amount was corrected to calculate the adsorption amount considering the very slight amount of the observed mass decrease of the carbon black. The adsorption amount of polymeric dispersant per unit mass of carbon black was divided by the specific surface area of the carbon black used. The calculation result was determined as the adsorption amount per surface area of the carbon black. The results are shown in Table 3.

Evaluation on Storage Test of Ink

The initial viscosity of the inks of Examples 1 to 10 and Comparative Examples 1 to 4 were measured by a cone plate type rotation viscometer (manufactured by TOKI SANGYO CO., LTD.). The measuring conditions were set in such that the temperature of the hemathermal circulating water was 25 degrees C., the number of rotation was 50 rotation per minute (rpm), and the shearing speed was 191.4 sec$^{-1}$. In addition, the storage viscosity of the inks of Examples 1 to 10 and Comparative Examples 1 to 4 was measured after left still at 70 degrees C. for 14 days. The calculation results of the viscosity change rate are shown in Table 3.

Inkjet Discharging Property

Piezo type inkjet heads capable of controlling the temperature of the ink from the ink supplying system to the heads were used as the inkjet recording device. This inkjet recording device was filled with each ink of Examples 1 to 9 and Comparative Examples 1 to 4. The temperature was controlled in such a manner that the ink viscosity was 10 mPa·S and discharging at the initial state was evaluated at an ink discharging speed of 3 kHz. Moreover, also the device was filled with the ink that had been left still at 70 degrees C. for 14 days and used for the evaluation on the storage test described above and ink discharging was evaluated in the same manner as in the storage test. The temperature conditions were the same as in the evaluation condition of the initial ink. The results are shown in Table 3. The temperature condition in which the ink viscosity was in the range of from 0.95 mPa·S to 1.05 mPa·S was checked by using a cone plate type viscometer capable of controlling temperatures and determined as the heating condition at the time of printing.

A: Discharged

B: Not dischargeable

TABLE 3

| | CB liquid dispersion | Surface Treated CB | Adsorption amount of dispersant for CB (mg/m$^2$) | Viscosity change rate percent | Initial ink discharge-ability | Stored ink discharge-ability |
|---|---|---|---|---|---|---|
| Example 1 | Liquid dispersion 1 of CB | Surface treated CB1 | 1.25 | −3.2 | A | A |
| Example 2 | Liquid dispersion 2 of CB | Surface treated CB1 | 1.28 | −2.0 | A | A |
| Example 3 | Liquid dispersion 3 of CB | Surface treated CB1 | 1.37 | −1.5 | A | A |
| Example 4 | Liquid dispersion 4 of CB | Surface treated CB2 | 1.22 | −5.0 | A | A |
| Example 5 | Liquid dispersion 5 of CB | Surface treated CB3 | 1.39 | −1.1 | A | A |
| Example 6 | Liquid dispersion 6 of CB | Surface treated CB4 | 1.09 | 8.2 | A | A |
| Example 7 | Liquid dispersion 7 of CB | Surface treated CB5 | 1.16 | 7.4 | A | A |
| Example 8 | Liquid dispersion 8 of CB | Surface treated CB8 | 1.22 | −5.1 | A | A |
| Example 9 | Liquid dispersion 9 of CB | Surface treated CB8 | 0.98 | 9.6 | A | A |
| Example 10 | Liquid dispersion 10 of CB | Surface treated CB2 | 0.99 | 9.2 | A | A |
| Comparative Example 1 | Liquid dispersion 11 of CB | Surface treated CB6 | 0.88 | 28.6 | A | B |
| Comparative Example 2 | Liquid dispersion 12 of CB | Surface treated CB7 | 0.87 | 35.7 | A | B |
| Comparative Example 3 | Liquid dispersion 13 of CB | Surface treated CB2 | 0.76 | 42.3 | A | B |
| Comparative Example 4 | Liquid dispersion 14 of CB | Non-surface-treated CB9 | 0.52 | 70.5 | A | B |

As seen in the results shown in Table 3, the inks of Examples 1 to 10 had larger amounts of adsorption of the dispersant for carbon black, smaller viscosity change rates after the ink storage, and higher levels of dispersion stability than those of Comparative Examples 1 to 4, and were able to be discharged after the storage. This is inferred that affinity between the pigment and the polymeric dispersant in the polymerizable monomer having at least a certain level of polarity became strong, thereby increasing the adhesion force of the polymeric dispersant, so that the polymeric dispersant was not easily detached and consequently, the dispersion stability was enhanced. Of these, the storage property of the inks of Examples 4, 6, and 9 were slightly inferior. Inferentially, this is because the polymerizable monomer used as the dispersion medium had lower polarity. In Example 10, a low molecular weight dispersant was used for the ink. As a result, the adsorption amount was reduced and the viscosity change rate was slightly large in comparison with the case of a polymeric dispersant. On the other hand, in Comparative Examples 1 to 4 that did not satisfy the requisites of the present disclosure, the adsorption amount of the dispersant for carbon black was small, the viscosity change rate after storage was large, and the ink after storage was not able to be discharged although the ink was initially discharged. This is inferred that affinity between the pigment and the polymeric dispersant was weak so that the polymeric dispersant was easily detached, resulting in degradation of dispersion stability.

Next, Examples 11 to 20 and Comparative Examples 5 to 7 describe cases in which the inorganic pigment is titanium oxide.

Preparation Example of Surface-Treated Titanium Oxide
Preparation of Surface-Treated Titanium Oxide 1
100 g of titanium oxide pigment (JR-403, manufactured by TAYCA CORPORATION) was added to a solution of dimethylformamide to which 30 g of 2-chloroethane sulfonic acid was added followed by reflux at 110 degrees C. for 24 hours.

Subsequent to centrifugal at 13,000 rpm for 20 minutes, the supernatant solution was removed.

Thereafter, the resultant was dispersed in methanol followed by centrifugal again and precipitates were collected followed by rinsing with ethanol. The precipitate was dried at 25 degrees C. for six hours under a reduced pressure to obtain [Surface-treated titanium oxide 1]. The content of sulfonic acid group of the thus-obtained [Surface-treated titanium oxide 1] was calculated utilizing Fourier-transform infrared spectroscopy (FT-IR). As a result, the content of sulfonic acid group was 620 µmol/g. When this value was divided by the specific surface area 14 m²/g of titanium oxide pigment (JR-403), the result was 44.3 µmol/m². The obtained data are shown in Table 4.

Preparation of Surface-Treated Titanium Oxides 2 to 4 and 7

Similarly, the titanium oxide shown in Table 1 was subject to sulfonation treatment with surface-treating agent shown in Table 4 to obtain [Surface treated titanium oxide 2] to [Surface treated titanium oxide 4] and [Surface treated titanium oxide 7].

The amount of sulfonic acid group and the specific surface area of value of [Surface treated titanium oxide 2] to [Surface treated titanium oxide 4] and [Surface treated titanium oxide 7] were measured in the same manner as in [Surface treated titanium oxide 1] to calculate the value of the amount of sulfonic acid group to the specific surface area. The obtained data are shown in Table 4.

Preparation of Surface-Treated Titanium Oxide 5

100 g of titanium oxide pigment (TAITANIX JA-1, manufactured by TAYCA CORPORATION) was added to a toluene solution to which 30 g of 1,3-propane sultone was added followed by reflux at 120 degrees C. for 24 hours. Subsequent to centrifugal at 13,000 rpm for 20 minutes, the supernatant solution was removed. Thereafter, the resultant was dispersed in methanol followed by centrifugal again and precipitates were collected followed by rinsing with ethanol. The precipitate was dried at 25 degrees C. for six hours under a reduced pressure to obtain [Surface-treated titanium oxide 5]. The content of sulfonic acid group of the thus-obtained [Surface-treated titanium oxide 5] was calculated utilizing Fourier-transform infrared spectroscopy (FT-TR). As a result, the content of sulfonic acid group was 240 µmol/g. When this value was divided by the specific surface area 9 m²/g of titanium oxide pigment (TAITANIX JA-1), the result was 26.7 µmol/m². The obtained data are shown in Table 4.

Preparation of Surface-Treated Titanium Oxide 6

20 mL of meracaptopropyl methoxysilane was gradually titrated to a liquid mixture of 18 mL of water, 1 mL of 35% hydrochloric acid, and 100 mL of ethanol followed by stirring at 50 degrees C. for one hour. Next, the resultant was mixed with a solution in which 100 g of titanium oxide pigment TTO-55 (D) (manufactured by ISHIHARA SANGYO KAISHA, LTD.) followed by stirring at 70 degrees C. for 13 hours. 100 g of the synthesized titanium oxide having a mercapto group was stirred at 70 degrees C. for two hours in a liquid mixture of 400 mL of ethanol and 100 mL of hydrogen peroxide solution to replace the mercapto group with a sulfonic acid group to obtain [Surface-treated titanium oxide 6]. The content of sulfonic acid group of the thus-obtained [Surface-treated titanium oxide 6] was calculated utilizing Fourier-transform infrared spectroscopy (FT-IR). As a result, the content of sulfonic acid group was 620 µmol/g. When this value was divided by the specific surface area 75 m²/g of titanium oxide (CR-EL), the result was 8.3 µmol/m².

The obtained data are shown in Table 4.

Preparation of Surface-Treated Titanium Oxide 8 and 9

The titanium oxide shown in Table 1 was subject to sulfonation treatment with surface-treating agent shown in Table 1 in the same manner as in the preparation of [Surface treated titanium oxide 5] to obtain [Surface treated titanium oxide 8] and [Surface treated titanium oxide 9].

The amount of sulfonic acid group and the specific surface area of [Surface treated titanium oxide 8] and [Surface treated titanium oxide 9] were measured in the same manner as in [Surface treated titanium oxide 1] to calculate the value of the rate of the amount of sulfonic acid group to the specific surface area. The obtained data are shown in Table 4.

Preparation of Surface-Treated Titanium Oxide 10

The titanium oxide pigment (CR-EL, manufactured by ISHIHARA SANGYO KAISHA, LTD.) not subject to surface treatment was determined as [Non-surface treated titanium oxide 10].

TABLE 4

| | Titanium oxide # | | Specific surface area (m²/g) | Sulfonating agent | Content of sulfonic acid group (µmol/g) | Content of sulfonic acid group/specific surface area (µmol/m²) |
|---|---|---|---|---|---|---|
| Surface-treated titanium oxide 1 | JR403 | TAYCA CORPORATION | 14 | 2-chloroethane sulfonic acid | 620 | 44.3 |
| Surface-treated titanium oxide 2 | MT-900D | TAYCA CORPORATION | 25 | 1,3-propane sultone | 380 | 15.2 |
| Surface-treated titanium oxide 3 | KR-380 | Titan Kogyo, Ltd. | 11 | 2-chloroethane sulfonic acid | 240 | 21.8 |
| Surface-treated titanium oxide 4 | KR-380 | Titan Kogyo, Ltd. | 11 | 4-chloro-1-butane sulfonic acid | 410 | 37.3 |
| Surface-treated titanium oxide 5 | TAITANIX JA-1 | TAYCA CORPORATION | 9 | 1,3-propane sultone | 240 | 26.7 |
| Surface-treated titanium oxide 6 | TTO-55(D) | ISHIHARA SANGYO KAISHA, LTD. | 75 | mercaptopropyl trimethoxy silane | 620 | 8.3 |

TABLE 4-continued

|  | Titanium oxide # | Specific surface area ($m^2/g$) | Sulfonating agent | Content of sulfonic acid group (μmol/g) | Content of sulfonic acid group/specific surface area (μmol/$m^2$) |
|---|---|---|---|---|---|
| Surface-treated titanium oxide 7 | CR-EL ISHIHARA SANGYO KAISHA, LTD. | 7 | 2-chloroethane sulfonic acid | 590 | 84.3 |
| Surface-treated titanium oxide 8 | TAITANIX JA-1 TAYCA CORPORATION | 9 | 1,4-butane sultone | 800 | 88.9 |
| Surface-treated titanium oxide 9 | TTO-55(D) ISHIHARA SANGYO KAISHA, LTD. | 75 | 1,4-butane sultone | 500 | 6.7 |
| Surface-treated titanium oxide 10 | CR-EL ISHIHARA SANGYO KAISHA, LTD. | 7 | No surface treated | 0 | 0.0 |

Preparation Example of Liquid Dispersion of Titanium Oxide

Preparation Example of Liquid Dispersion 1 of Titanium Oxide 10 parts of a dispersant (BYKJET-9151, manufactured by BYK Japan K.K.) was charged in 90 parts of VISCOAT® #192 (Chemical formula M-1, SP value: 10.12) followed by stirring at 40 degrees C. for two hours for dissolution to manufacture a dispersion medium.

80 parts of zirconia ball having a diameter of 2 mm, 11.25 parts of [Surface-treated titanium oxide 1] manufactured in the Preparation Example described above, and 11.25 parts of the dispersion medium prepared as described above were placed in a 70 mL bottle of mayonnaise followed by dispersion by a ball mill for three days to prepare [Liquid dispersion 1 of titanium oxide].

Media: YTZ ball: diameter 2 mm (zirconia ball, manufactured by NIKKATO CORPORATION)

Mill: MIX-ROTAR VMR-5 (manufactured by AS ONE Corporation)

Number of rotation: 75 rpm (number of rotation of bottle)

Preparation Example of Liquid Dispersion 2 to 13 of Titanium Oxide

Liquid dispersions 2 to 13 of titanium oxide were prepared in the same manner as in preparation of liquid dispersion 1 of titanium oxide using [Surface treated titanium oxide 1] to [Surface treated titanium oxide 9] and [Non-surface treated titanium oxide 10] and the dispersants and the monomers shown in Table 5.

Measuring of Amine Value of Dispersant

The amine value of the dispersant was measured as follows.

1 g of a dispersant was dissolved in 100 mL of methyl isobutyl ketone and the solution was subject to potentiometric titration by 0.01 mol/L methyl isobutyl ketone chlorate solution. The amine value was determined as the value in KOHmg/g conversion. Potentiometric titration was conducted using an automatic titration instrument (GT-200, manufactured by Mitsubishi Chemical Analytech Co., Ltd.)

TABLE 5

| Liquid dispersion of titanium oxide | Surface-treated titanium oxide | Dispersant/Amine value (KOHmg/g) | Monomer/ SP value |
|---|---|---|---|
| Liquid dispersion 1 of titanium oxide | Surface-treated titanium oxide 1 | BYKJET-9151/17.2 | VISCOAT ® #192/10.12 |
| Liquid dispersion 2 of titanium oxide | Surface-treated titanium oxide 1 | DISPERBYK-108/70.2 | VISCOAT ® #155/9.26 |
| Liquid dispersion 3 of titanium oxide | Surface-treated titanium oxide 1 | BYKJET-9151/17.2 | ACMO/22.90 |
| Liquid dispersion 4 of titanium oxide | Surface-treated titanium oxide 2 | Solsperse 39000/25.9 | VISCOAT ® #155/9.26 |
| Liquid dispersion 5 of titanium oxide | Surface-treated titanium oxide 2 | BYKJET-9151/17.2 | ACMO/22.90 |
| Liquid dispersion 6 of titanium oxide | Surface-treated titanium oxide 3 | AJISPER PB822/18.2 | VISCOAT ® #160/10.14 |
| Liquid dispersion 7 of titanium oxide | Surface-treated titanium oxide 4 | AJISPER PB822/18.2 | VISCOAT ® #192/10.12 |
| Liquid dispersion 8 of titanium oxide | Surface-treated titanium oxide 5 | DISPERBYK-108/70.2 | VISCOAT ® #150/9.62 |
| Liquid dispersion 9 of titanium oxide | Surface-treated titanium oxide 6 | BYKJET-9151/17.2 | ACMO/22.90 |
| Liquid dispersion 10 of titanium oxide | Surface-treated titanium oxide 7 | BYKJET-9151/17.2 | VISCOAT ® #150/9.62 |
| Liquid dispersion 11 of titanium oxide | Surface-treated titanium oxide 8 | DISPERBYK-180/92.1 | VISCOAT ® #192/10.12 |

TABLE 5-continued

| Liquid dispersion of titanium oxide | Surface-treated titanium oxide | Dispersant/Amine value (KOHmg/g) | Monomer/ SP value |
|---|---|---|---|
| Liquid dispersion 12 of 180/92.1 titanium oxide | Surface-treated titanium oxide 9 | DISPERBYK-180/92.1 | VISCOAT ® #160/10.14 |
| Liquid dispersion 13 of titanium oxide | Surface-treated titanium oxide 10 | DISPERBYK-180/92.1 | VISCOAT ® #160/10.14 |

Example 11

An ink of Example 11 was manufactured by preparing the following recipe.

| | |
|---|---|
| Liquid dispersion 1 of titanium oxide: | 10 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 12

An ink of Example 12 was manufactured by preparing the following recipe.

| | |
|---|---|
| Liquid dispersion 2 of titanium oxide: | 50 parts |
| Mono-functional monomer VISCOAT ® #155 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 13

An ink of Example 13 was manufactured by preparing the following recipe.

| | |
|---|---|
| Liquid dispersion 3 of titanium oxide: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 14

An ink of Example 14 was manufactured by preparing the following recipe.

| | |
|---|---|
| Liquid dispersion 4 of titanium oxide: | 50 parts |
| Mono-functional monomer VISCOAT ® #155 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 15

An ink of Example 15 was manufactured by preparing the following recipe.

| | |
|---|---|
| Liquid dispersion 5 of titanium oxide: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 16

An ink of Example 16 was manufactured by preparing the following recipe.

| | |
|---|---|
| Liquid dispersion 6 of titanium oxide: | 50 parts |
| Mono-functional monomer VISCOAT ® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |

Example 17

An ink of Example 17 was manufactured by preparing the following recipe.

| | |
|---|---|
| Liquid dispersion 7 of titanium oxide: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 18

An ink of Example 18 was manufactured by preparing the following recipe.

| | |
|---|---|
| Liquid dispersion 8 of titanium oxide: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 19

An ink of Example 19 was manufactured by preparing the following recipe.

| | |
|---|---|
| Liquid dispersion 9 of titanium oxide: | 50 parts |
| Mono-functional monomer ACMO (manufactured by KOHJIN Film & Chemicals Co., Ltd.): | 25 parts |
| Mono-functional monomer VISCOAT ® #160 (manufactured by OSAKA ORGANIC CHEMICAL INDUSTRY LTD.: | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Example 20

An ink of Example 20 was manufactured by preparing the following recipe.

| | |
|---|---|
| Liquid dispersion 10 of titanium oxide: | 50 parts |
| Mono-functional monomer VISCOAT ® #150 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 5

An ink of Comparative Example 5 was manufactured by preparing the following recipe.

| | |
|---|---|
| Liquid dispersion 11 of titanium oxide: | 50 parts |
| Mono-functional monomer VISCOAT ® #192 (manufactured by OSAKA ORGANIC CHEMICAL INDUSTRY LTD.: | 25 parts |
| Mono-functional monomer ACMO (manufactured by KOHJTN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 6

An ink of Comparative Example 6 was manufactured by preparing the following recipe.

| | |
|---|---|
| Liquid dispersion 12 of titanium oxide: | 50 parts |
| Mono-functional monomer VISCOAT ® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT ® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Comparative Example 7

An ink of Comparative Example 7 was manufactured by preparing the following recipe.

| | |
|---|---|
| Liquid dispersion 13 of titanium oxide: | 50 parts |
| Mono-functional monomer VISCOAT® #160 (manufactured by OSAKA ORGANIC CHEMICAL INDUSTRY LTD.: | 25 parts |
| Mono-functional monomer ACMO (manufactured by KOHJIN Film & Chemicals Co., Ltd.): | 12.5 parts |
| Bi-functional monomer VISCOAT® #260, manufactured by OSAKA ORGANIC CHEMICAL INDUSTRY LTD.: | 0.9 parts |
| Ultraviolet curable resin UV-3010B, manufactured by The Nippon Synthetic Chemical Industry Co., Ltd.: | 5.5 parts |
| Photopolymerization initiator Irgacure 184 (manufactured by BASF): | 6 parts |
| Polymerization inhibitor TBH, manufactured by Seiko Chemical Co., Ltd.: | 0.1 parts |

Evaluation on Storage Test of Ink

The initial viscosity of the inks of Examples 11 to 20 and Comparative Examples 5 to 7 were measured by a cone plate type rotation viscometer (manufactured by TOKI SANGYO CO., LTD.). The measuring conditions were set in such that the temperature of the hemathermal circulating water was 25 degrees C., the number of rotation was 50 rotation per minute (rpm), and the shearing speed was 191.4 sec$^{-1}$. In addition, the storage viscosity of the inks of Examples 11 to 20 and Comparative Examples 5 to 7 was measured after left still at 70 degrees C. for 14 days. The calculation results of the viscosity change rate are shown in Table 6.

Titanium oxide has a large specific gravity and tends to be significantly sedimented in comparison with other pigments. Therefore, the inks of Examples 1 to 20 and Comparative Examples 5 to 7 were evaluated about sedimentation property and re-dispersibility. In addition, titanium oxide, even having a good dispersibility, may become transparent due to factors such as the size of particle diameter so that the image brightness of the titanium oxide was also evaluated.

Inkjet Discharging Property

Piezo type inkjet heads capable of controlling the temperature of an ink conveyed from the ink supplying system to the heads were used as the inkjet recording device. This inkjet recording device was filled with each ink of Examples 11 to 20 and Comparative Examples 5 to 7. The temperature was controlled in such a manner that the ink viscosity was 10 mPa·S and discharging at the initial state was evaluated at an ink discharging speed of 3 kHz. Moreover, also the device was filled with the ink that had been left still at 70 degrees C. for 14 days and used for the evaluation on the storage test described above and ink discharging was evaluated in the same manner as in the storage test. The temperature conditions were the same as in the evaluation condition of the initial ink. The results are shown in Table 6.

The temperature condition in which the ink viscosity was in the range of from 0.95 mPa·S to 1.05 mPa·S was checked by using a cone plate type viscometer capable of controlling temperatures and determined as the heating condition at the time of printing.

A: Discharged

B: Not dischargeable

Evaluation on Sedimentation of Ink

The inks of Examples 11 to 20 and Comparative Examples 5 to 7 was measured by a turbiscan (MA2000, manufactured by EKO Instruments) for sedimentation of titanium oxide in the inks.

The ink was subject to ultrasonic dispersion treatment (100 W, 40 minutes) to be uniformized by an ultrasonic cleaner (US-3, manufactured by AS ONE Corporation) and thereafter 5.5 mL of the ink was charged in a glass cell specialized for the cleaner by a pipette. 30 minutes later at which the liquid level of the ink was stabilized, the measuring was conducted. This point in time was determined as the start of sedimentation evaluation. Thereafter, the ink was left still at 60 degrees C. and kept measured for 240 hours. Sedimentation was checked and indicated by deviation display using the start of sedimentation evaluation as reference. Sedimentation was checked by quantity survey (relative value mode) of the peaks representing changes of backscattered light mainly due to production of supernatant and evaluated according to the following criteria: The evaluation results are shown in Table 6.

Evaluation Criteria

A: Relative change of backscattered light 240 hours after the start of evaluation less than 5 percent B: Relative change of backscattered light 240 hours after the start of evaluation 5 percent to less than 10 percent C: Relative change of backscattered light 240 hours after the start of evaluation 10 percent or greater Evaluation on Re-Dispersibility of Titanium Oxide Re-dispersibility of the inks of Examples 11 to 20 and Comparative Examples 5 to 7 was evaluated. After 30 mL of the prepared ink was charged in a 50 mL vial bottle and left still at room temperature (25 degrees C.) for one month, re-dispersibility of the settled titanium oxide was evaluated according to the following criteria. The evaluation results are shown in Table 6.

Evaluation Criteria

A: Sedimentation of titanium dioxide disappears by shaking the vial bottle for 10 seconds and back to the particle diameter before left still B: Sedimentation of titanium dioxide disappears by ultrasonic irradiation (100 W) for titanium dioxide settled in the vial bottle for two minutes by an ultrasonic cleaner (US-3, manufactured by AS ONE Corporation) and back to the particle diameter before left still C: Solid portion in the ink agglomerates and not re-dispersed by stirring.

Image Brightness of Printed Image

Image brightness of printed images of the inks of Examples 11 to 20 and Comparative Examples 5 to 7 was evaluated. After it was confirmed that no defective images were printed using an inkjet printer (IPSiO GX3000, manufactured by Ricoh Company Ltd.) after filling the ink cartridge of the printer and all the nozzles with the ink, the discharging amount of the ink was adjusted in such a manner that the attached amount of the ink onto a recording 20 g/m$^2$. A 50 mm×50 mm solid image was printed on a transparent sheet serving as the recording medium. Placing a black sheet available on market under the transparent sheet on which the image was printed, the brightness (L*) of the printed portion was measured using a spectrophotometer (X-Rite 938, manufactured by X-Rite) and evaluated according to the following evaluation criteria. The evaluation results are shown in Table 3. When the L* value was measured as reference for a transparent sheet which had no image on and was placed on a black sheet, it was 22.4.

Evaluation Criteria

A: L* value is 75 or greater

B: L* value is 65 to less than 75

A: L* value is less than 65.

TABLE 6

| | Liquid dispersion of titanium oxide | Surface-treated titanium oxide | Viscosity change rate (percent) | Initial ink discharge-ability | Stored ink discharge-ability | Sedimen-tation | Re-dispers-ibility | Image brightness |
|---|---|---|---|---|---|---|---|---|
| Example 11 | Liquid dispersion 1 of titanium oxide | Surface-treated titanium oxide 1 | −2.1 | A | A | A | A | A |
| Example 12 | Liquid dispersion 2 of titanium oxide | Surface-treated titanium oxide 1 | 8.9 | A | A | B | B | B |
| Example 13 | Liquid dispersion 3 of titanium oxide | Surface-treated titanium oxide 1 | −4.2 | A | A | A | A | A |
| Example 14 | Liquid dispersion 4 of titanium oxide | Surface-treated titanium oxide 2 | −5.2 | A | A | B | A | B |
| Example 15 | Liquid dispersion 5 of titanium oxide | Surface-treated titanium oxide 2 | 1.5 | A | A | B | A | A |
| Example 16 | Liquid dispersion 6 of titanium oxide | Surface-treated titanium oxide 3 | −2.5 | A | A | A | B | A |
| Example 17 | Liquid dispersion 7 of titanium oxide | Surface-treated titanium oxide 4 | −2.7 | A | A | A | B | B |
| Example 18 | Liquid dispersion 8 of titanium oxide | Surface-treated titanium oxide 5 | 7.4 | A | A | B | B | B |
| Example 19 | Liquid dispersion 9 of titanium oxide | Surface-treated titanium oxide 6 | −8.1 | A | A | C | B | C |
| Example 20 | Liquid dispersion 10 of titanium oxide | Surface-treated titanium oxide 7 | −6.4 | A | A | B | A | B |
| Comparative Example 5 | Liquid dispersion 11 of titanium oxide | Surface-treated titanium oxide 8 | 22.1 | A | B | B | B | C |
| Comparative Example 6 | Liquid dispersion 12 of titanium oxide | Surface-treated titanium oxide 9 | 41.2 | A | B | C | C | C |
| Comparative Example 7 | Liquid dispersion 13 of titanium oxide | Surface-treated titanium oxide 10 | 38.7 | A | B | C | C | C |

As seen in the results shown in Table 6, the inks of Examples 11 to 20 had smaller viscosity change rates after ink storage and higher levels of dispersion stability than the inks of Comparative Examples 5 to 7, and were able to be discharged after the storage. This is inferred that affinity between the pigment and the polymeric dispersant in the polymerizable monomer having at least a certain level of polarity became strong, thereby increasing the adhesion force of the polymeric dispersant, so that the polymeric dispersant was not easily detached and consequently, the dispersion stability was enhanced. Of these, the storage property of the inks of Examples 12 and 14 were slightly inferior. Inferentially, this is because the polymerizable monomer used as the dispersion medium had lower polarity. In Examples 12 and 18, a low molecular weight dispersant was used for the ink. As a result, the viscosity change rate was slightly large in comparison with the case of a polymeric dispersant. On the other hand, in Comparative Examples 5 to 7 that did not satisfy the requisites of the present disclosure, the viscosity change rate after storage was large, and the ink after storage was not able to be discharged although the ink was initially discharged. This is inferred that affinity between the pigment and the polymeric dispersant was weak so that the polymeric dispersant was easily detached, resulting in degradation of dispersion stability. The inks of Examples 11 to 20 were good about the evaluation of sedimentation and re-dispersibility of titanium oxide.

That is, the active energy ray curable composition of the present disclosure has excellent dispersion stability and discharging property using an inorganic pigment as a colorant simultaneously.

Having now fully described embodiments of the present invention, it will be apparent to one of ordinary skill in the art that many changes and modifications can be made thereto without departing from the spirit and scope of embodiments of the invention as set forth herein.

What is claimed is:

1. An active energy ray curable composition comprising:
   an inorganic pigment; and
   a polymerizable monomer,
   wherein the inorganic pigment is carbon black having a ratio of an amount of hydrophilic functional group to a specific surface area in a range of from 8.2 μmol/m$^2$ to 42 μmol/m$^2$ or a metal oxide having a ratio of an amount of sulfonic acid group to a specific surface area in a range of from 7 μmol/m$^2$ to 85 μmol/m$^2$,
   wherein the active energy ray curable composition has a viscosity change rate (ΔV) represented by the following relation 1 from −10 percent by mass to +10 percent by mass:

$$\Delta V(\%) = |V - V_0|/V_0 \times 100 \qquad \text{relation 1,}$$

where $V_0$ represents an initial viscosity at 25 degrees C. and V represents a storage viscosity after the active energy ray curable composition is stored still at 70 degrees C. for 14 days.

2. The active energy ray curable composition according to claim 1, wherein the viscosity change rate (ΔV) is from −5% by mass to +5% by mass.

3. The active energy ray curing type composition according to claim 1, wherein the carbon black is surface-treated with a sulfonating agent.

4. The active energy ray curing type composition according to claim 3, further comprising a polymeric dispersant wherein a dispersant adsorption amount to the carbon black is at least 1.0 mg/m$^2$.

5. The active energy ray curable composition according to claim 1, wherein the metal oxide is titanium oxide.

6. The active energy ray curable composition according to claim 5, wherein the titanium oxide is surface-treated with an alkylhalogen compound having a sulfonic acid group.

7. The active energy ray curable composition according to claim 1, further comprising a polymeric dispersant.

8. The active energy ray curable composition according to claim 7, wherein the polymeric dispersant is a polymer having a basic polar functional group.

9. The active energy ray curable composition according to claim 1, wherein the polymerizable monomer has a solubility parameter (SP) value of 9.5 or higher.

10. An ink comprising:
    the active energy ray curable composition of claim 1.

11. The ink according to claim 10, wherein the ink is used for inkjet printing.

12. A composition-stored container comprising:
    the active energy ray curable composition of claim 1.

13. A two-dimensional or three-dimensional image forming apparatus comprising:
    the composition-stored container of claim 12.

* * * * *